(12) United States Patent
Katzur

(10) Patent No.: US 7,170,901 B1
(45) Date of Patent: Jan. 30, 2007

(54) INTEGER BASED ADAPTIVE ALGORITHM FOR DE-JITTER BUFFER CONTROL

(75) Inventor: Ran Katzur, N. Potomac, MD (US)

(73) Assignee: LSI Logic Corporation, Milpitas, CA (US)

( * ) Notice: Subject to any disclaimer, the term of this patent is extended or adjusted under 35 U.S.C. 154(b) by 886 days.

(21) Appl. No.: 09/999,330

(22) Filed: Oct. 25, 2001

(51) Int. Cl.
*H04L 12/56* (2006.01)

(52) U.S. Cl. .................. 370/412; 370/516; 370/519

(58) Field of Classification Search .......... 370/395.52, 370/412–421, 516–519; 710/52–53
See application file for complete search history.

(56) References Cited

U.S. PATENT DOCUMENTS

| | | | | |
|---|---|---|---|---|
| 6,195,333 B1 * | 2/2001 | Wise | | 370/235 |
| 6,259,677 B1 * | 7/2001 | Jain | | 370/252 |
| 6,370,125 B1 * | 4/2002 | Belk | | 370/312 |
| 6,452,950 B1 * | 9/2002 | Ohlsson et al. | | 370/516 |
| 6,684,273 B2 * | 1/2004 | Boulandet et al. | | 710/52 |
| 6,693,921 B1 * | 2/2004 | Whitfield | | 370/516 |
| 6,859,460 B1 * | 2/2005 | Chen | | 370/412 |
| 6,862,298 B1 * | 3/2005 | Smith et al. | | 370/516 |
| 2002/0015387 A1 * | 2/2002 | Houh | | 370/250 |

OTHER PUBLICATIONS

A four (4) page article by Yi Liang, Nikolaus Farber and Bernd Girod, "Adaptive Playout Scheduling Using Time-Scale Modification in Packet Voice Communications" (in Proc. ICASSP 2001).

A four (4) page article by Fang Liu, Jong Won Kim and Jay Kuo, "Adaptive Delay Concealment For internet Voice Applications With Packet-Based Time-Scale Modification" (in Proc. ICASSP 2001).

* cited by examiner

Primary Examiner—Hassan Kizou
Assistant Examiner—Habte Mered
(74) Attorney, Agent, or Firm—Trexler, Bushnell, Giangiorgi, Blackstone & Marr Ltd.

(57) ABSTRACT

A device and method of controlling a de-jitter buffer, and specifically the nominal delay thereof. The nominal delay is adjusted based on delay information associated with a network in which the de-jitter buffer is located. The nominal delay is maintained between a minimum and maximum nominal delay, and is adjusted based on the probability that a packet will arrive outside a predetermined delay interval.

6 Claims, 5 Drawing Sheets

INTEGER BASED ADAPTIVE ALGORITHM FOR DE-JITTER BUFFER CONTROL

FIELD OF THE INVENTION

The present invention generally relates to voice-processing algorithms for DSL, ATM and IP applications, and more specifically relates to de-jitter buffers and nominal delays associated with de-jitter buffers.

BACKGROUND OF THE INVENTION

This invention relates to voice over packet (VOP) applications and more specifically to voice over DSL (VODSL) applications. VOP is used to provide cost-effective telephone services as an alternative to Public Switched Telephone Networks (PSTN's) using data networks. VODSL uses DSL links and Asynchronous Transfer Mode (ATM) protocol to enable the delivery of multiple telephone calls over a single pair of wires, in addition to providing a data link. An example of a DSL-based system that provides a multiple-calls telephone link as well as a data link is illustrated in FIG. 1.

The system 10 shown in FIG. 1 is representative of a system with which the present invention may be used. The system 10 includes an ATM Gateway 12, 14 at each end connected to a DSL Gateway 16, 18 via a copper twisted pair 20, 22, a plurality of telephones 24, 26, 28, 30, and a personal computer connected to the Internet (32). The system 10 shown in FIG. 1 also includes an "ATM cloud" 31 which represents other structures of the network. While the personal computer 32 is connected to the DSL Gateway 16 via a digital connection 34, the connections 36 between each of the telephones 24, 26, 28, 30 and the respective DSL Gateway 16, 18 are continuous analog connections. For example, if someone on telephone 26 is having a conversation with someone on telephone 30, and the person on telephone 26 speaks, the analog voice signal which DSL Gateway 16 receives from telephone 26 is sampled, packetized and sent over the network. Packets that are received by DSL Gateway 18 that arrive from the network are processed and converted back to an analog voice signal which is then sent to telephone 30.

A well-known problem with regard to using packets in a network to deliver real-time voice packets within a telephony application is the network delay, and more specifically the variance in the delay. The time it takes for a specific packet to travel from the source location to the destination is not constant and is a function of the instantaneous load of the switches between the two end points of the link. When the delay is short, a packet will arrive before it is supposed to be played, so there is no voice degradation. In contrast, when the delay is long, a packet may arrive after the time the packet was supposed to be played. In that case, the packet is tossed away, and the quality of voice is degraded.

The variance in the delay in the arriving of packets through a network is called jitter. To solve the jitter problem, systems use a de-jitter buffer. FIG. 2 illustrates the input and output scheme of a typical de-jitter buffer 40. With regard to the input, voice packet data arrives at the de-jitter buffer 40 in an unsynchronized fashion. That is, every time a packet arrives, it is received by the de-jitter buffer 40 and stored therein. First, the de-jitter buffer 40 is initialized. During initialization, the de-jitter buffer 40 is centered (or primed or initialized) to a nominal delay. The nominal delay is equal to the amount of de-jitter that the system can handle. For example, if each voice packet represents 10 milliseconds of voice, and the nominal delay is set at 50 milliseconds, the de-jitter buffer 40 will not send a packet out before there are at least five packets stored in the buffer 40. With regard to the output, after the de-jitter buffer 40 has been initialized (and a pre-determined initial number of packets have been stored in the de-jitter buffer 40), packets are read from the de-jitter buffer 40 in constant time intervals, such as one packet every 10 milliseconds, wherein exactly every 10 milliseconds, the local receive procedure pulls a packet from the de-jitter buffer 40. If one or more packets have been delayed in the network, the fact that five 10 millisecond packets have been stored in the de-jitter buffer 40 provides that the receive procedure can pull packets for the next 50 milliseconds from the de-jitter buffer 40 without degradation of the voice quality. When packets arrive faster from the network that they are pulled from the de-jitter buffer 40, they accumulate in the de-jitter buffer 40, and are not discarded.

A special procedure associated with de-jitter buffers allows packets that arrive out of order to be sorted so that these packets will be played (i.e. through the telephone) in the correct order. The bigger the de-jitter buffer (and the nominal delay), the better the de-jitter buffer can handle delay jitter. However, the bigger the buffer, the more delay the de-jitter buffer introduces to the system. Generally, total delay exceeding 150–250 milliseconds degrades the quality of the conservation over the network. Thus, the characteristics of a de-jitter buffer must be tuned to the characteristics of the network delay. The characteristics of the network delay might change constantly, especially in a packet switching network. Many adaptive algorithms have been suggested to achieve the "best" nominal delay for a given state of the network. Most of the algorithms which have been formulated have been based on a complex statistical analysis of the characteristics of the network. These techniques suffer from several drawbacks. If the technique is used, it is important to properly analyze the characteristics of the network delay because an error in the adaptive algorithm can result in additional degradation of the voice quality. Analyzing the characteristics of a network delay often requires a lot of complex computations which makes it very expansive in terms of computer power for multi-line systems. In addition, fixed point processors are commonly used in association with voice processing applications, and the computations associated with analyzing the delay characteristics of a network involve floating point calculations. Floating point calculations are difficult to implement in a fixed point processor.

OBJECTS AND SUMMARY OF THE INVENTION

A general object of an embodiment of the present invention is to provide an integer based low complexity adaptation algorithm that works well in a DSL/ATM environment.

Another object of an embodiment of the present invention is to provide a device which employs an integer based low complexity adaptation algorithm to automatically change the nominal delay of a de-jitter buffer based on delays associated with a network.

Still another object of an embodiment of the present invention is to provide a method of adjusting the nominal delay of a de-jitter buffer by calculating a probability that packets will arrive outside of a predetermined delay interval.

Still yet another object of an embodiment of the present invention is to provide a method of continuously adjusting the nominal delay of a de-jitter buffer between two threshold values.

Briefly, and in accordance with at least one of the foregoing objects, an embodiment of the present invention provides a device which includes a de-jitter buffer for receiving packets of information, and the de-jitter buffer has a nominal delay. The device is configured to adjust the nominal delay of the de-jitter buffer based on delay information associated with a network.

Preferably, the device is configured to calculate a probability that a packet will arrive outside a pre-determined delay interval and is configured to increment the nominal delay of the de-jitter buffer if the probability which is calculated is more than a first pre-determined delay interval. Preferably, the device is also configured to decrement the nominal delay of the de-jitter buffer if the probability which is calculated is less than a second pre-determined delay interval. Ideally, the device is configured to adjust the nominal delay of the de-jitter buffer down to a pre-determined minimum nominal delay and up to a pre-determined maximum nominal delay. By changing the nominal delay of a de-jitter buffer based on information that is collected since the last time that the nominal delay was changed, control of the de-jitter buffer is optimized in light of the characteristics of the network delay.

BRIEF DESCRIPTION OF THE DRAWINGS

The organization and manner of the structure and operation of the invention, together with further objects and advantages thereof, may best be understood by reference to the following description, taken in connection with the accompanying drawings, wherein like reference numerals identify like elements in which.

DESCRIPTION

Figure 1:
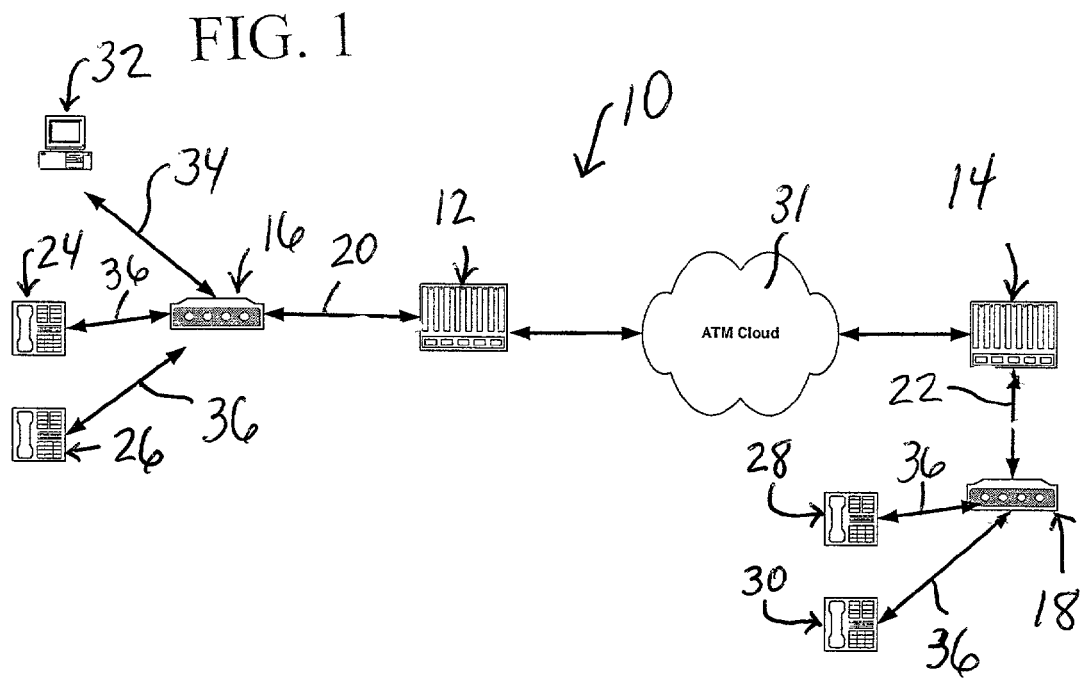
FIG. 1 is an illustration of a DSL-based system that provides a multiple-calls telephone link as well as a data link.
Figure 2:
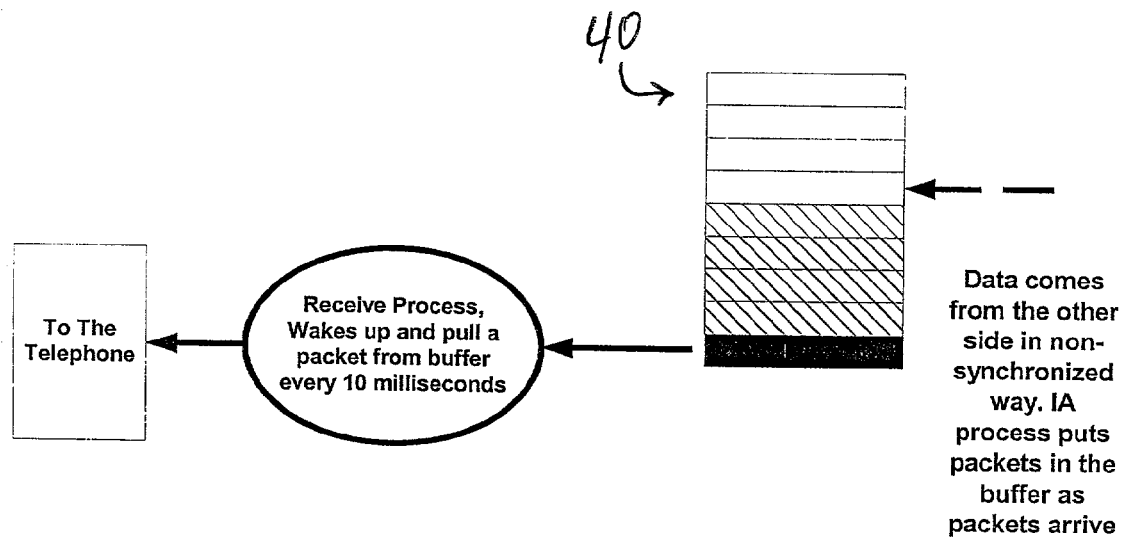
FIG. 2 is an illustration of a de-jitter buffer, showing the input and output scheme.

While the invention may be susceptible to embodiment in different forms, there is shown in the drawings, and herein will be described in detail, a specific embodiment with the understanding that the present disclosure is to be considered an exemplification of the principles of the invention, and is not intended to limit the invention to that as illustrated and described herein.

The invention is a device and method which employs an adaptive algorithm to change the nominal delay of a de-jitter buffer based on information that is collected since the last time that the nominal delay was changed. The statistic provides an estimation of the probability that packets will arrive outside of a certain delay interval. If the probability that packets will arrive outside of the delay interval is more that a pre-defined or pre-determined threshold, the nominal delay of the de-jitter buffer is incremented, up to a pre-defined maximum that represents the maximum nominal delay that is acceptable. On the other hand, if the probability that packets will arrive outside of the delay interval is less than a pre-defined or pre-determined second (smaller) threshold, the nominal delay of the de-jitter buffer is decremented, but is maintained to be more than a pre-defined or pre-determined minimum delay, as reducing the delay further will not contribute to the voice quality. By changing the nominal delay of a de-jitter buffer based on information that is collected since the last time that the nominal delay was changed, control of the de-jitter buffer is optimized in light of the characteristics of the network delay.

The device which provides such control of the nominal delay of a de-jitter buffer may be a module or some other device which resides between a network and telephone (see FIG. 1). Specifically, such a de-jitter buffer preferably resides in every edge device that is connected to the network from one side and to telephone on the other side, be it a DSL Gateway on a customer's premises (often called "Customer Premises Equipment" (CPE) or IAD), or at an ATM edge device, i.e. ATM Gateway, or even in an IP device such that is connected to an IP cloud. For example, in FIG. 1, the de-jitter buffer with such a controlled nominal delay may be provided in both DSL Gateways 16, 18, in both ATM Gateways 12, 14, or in one DSL Gateway and one ATM Gateway on the other side of the network.

Regardless, an adaptive algorithm is part of the process that reads packets from the de-jitter buffer. The flowcharts shown in FIGS. 3–6 depict the various steps of the algorithm. A detailed description of the flowcharts shown in FIGS. 3–6 follows.

Figure 3:
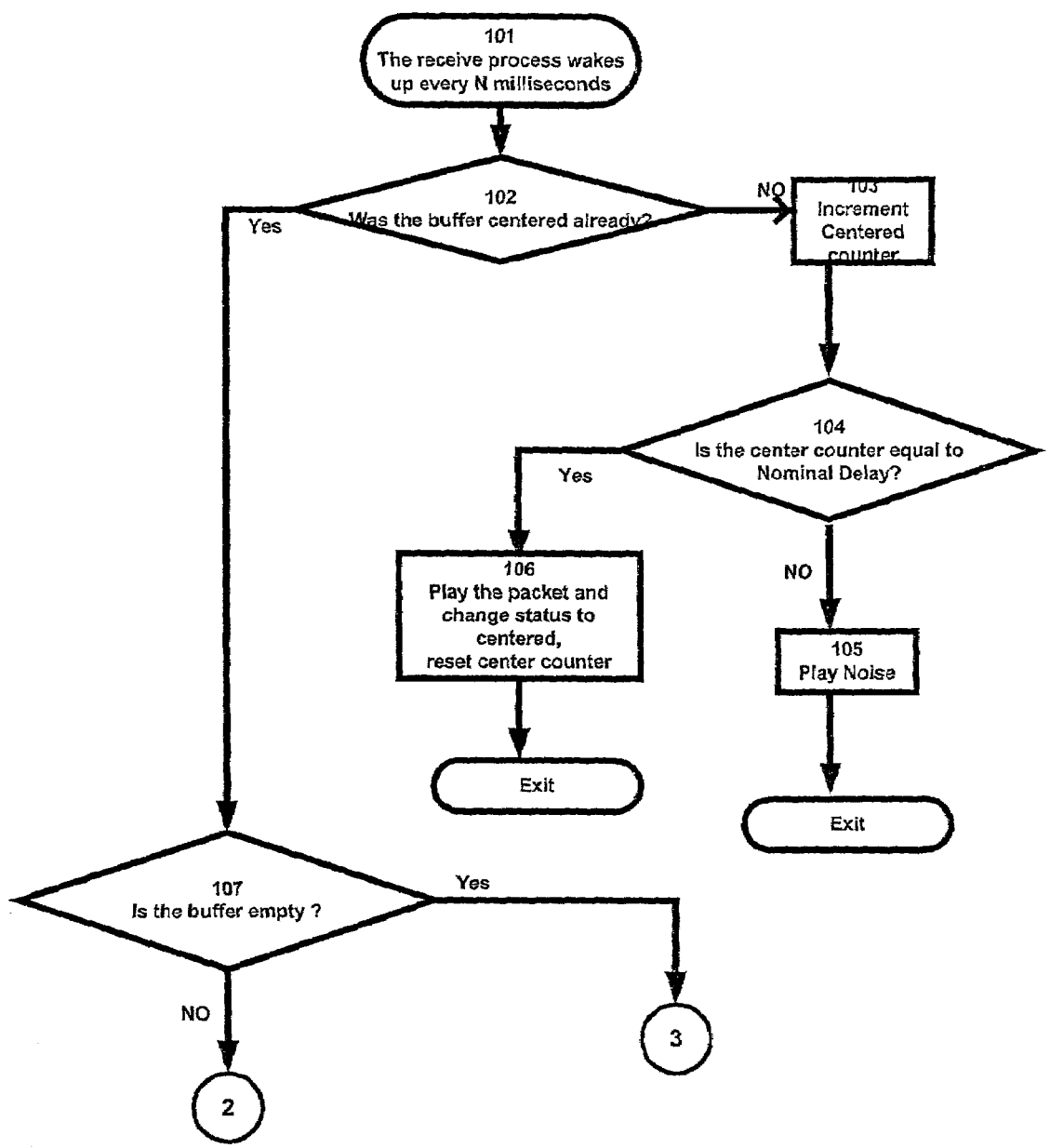
FIGS. 3–6 are flowcharts which depict various steps of an algorithm and system which is in accordance with an embodiment of the present invention.

In FIG. 3:

Block 101—The receive process is called every N milliseconds.

Block 102—to Block 106—The state of the buffer is checked. If the buffer is not centered yet, the receive process continues to play noise and increment the center counter. When the center counter reaches the nominal delay value, the state of the buffer is changed to centered, and the center counter is reset for the next time.

Block 107—if the buffer is centered, it is determined whether one or more packets are in the buffer. If there is a packet in the buffer, the algorithm continues at block 201 (see FIG. 4), if not, it continues at 301 (see FIG. 5).

Figure 4:
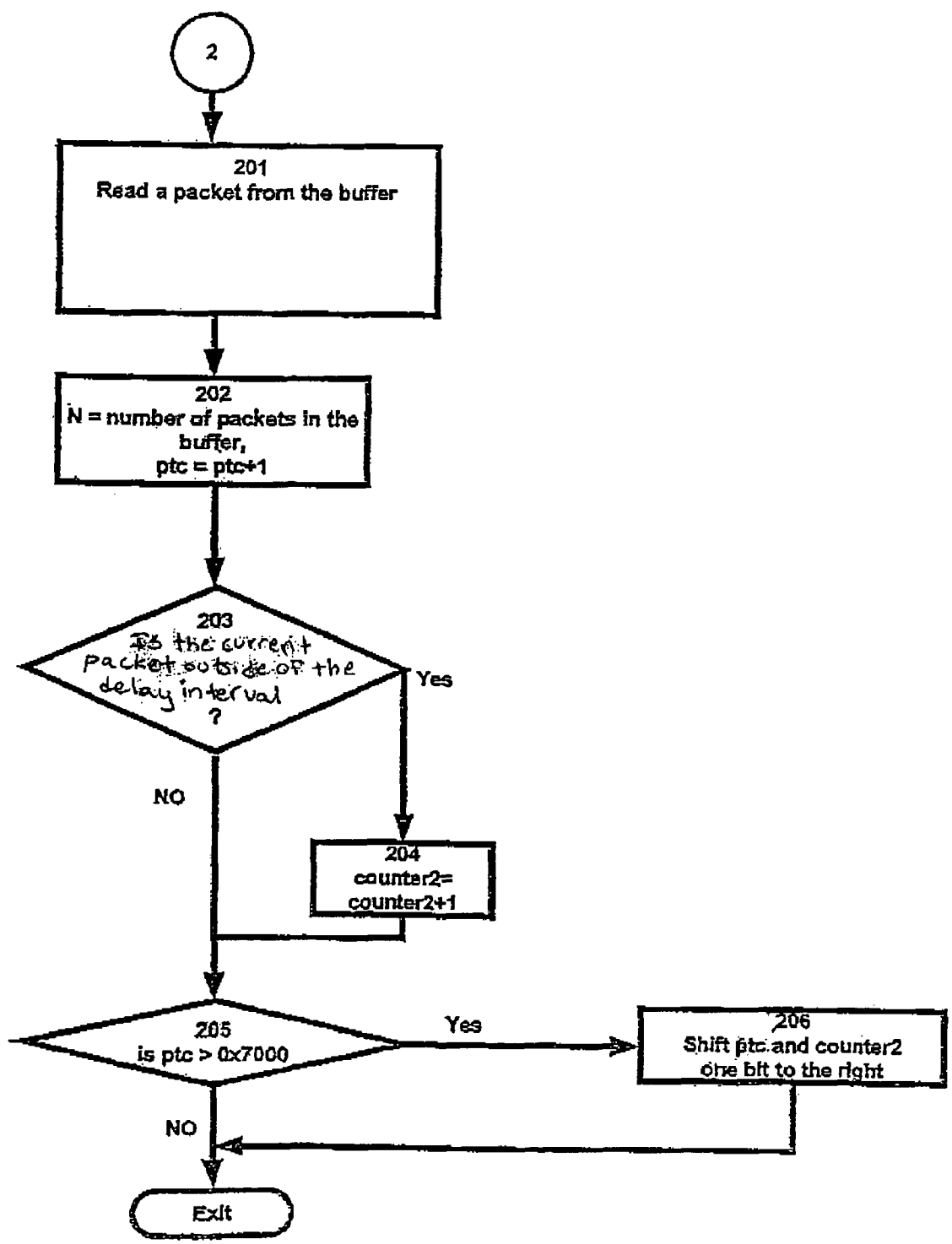

In FIG. 4:

Block 201–202—A packet is read from the buffer and processed using several counters including Counter2 which is the number of packets that are outside of the delay interval, and ptc which is incremented, wherein ptc is a counter of the total number of packets that were played since the last adaptation. In FIG. 4, N represents the number of packets in the buffer.

Block 203–Block 204—Test to see if the current packet is outside of the delay interval, if it is, increment the value counter2.

Block 205–Block 206—If the ptc counter reaches 0x7000, ptc is shifted one bit to the right, and counter2 is shifted one bit to the right. This maintains non-saturation counters while keeping the same ratio between ptc and counter2.

Figure 5:
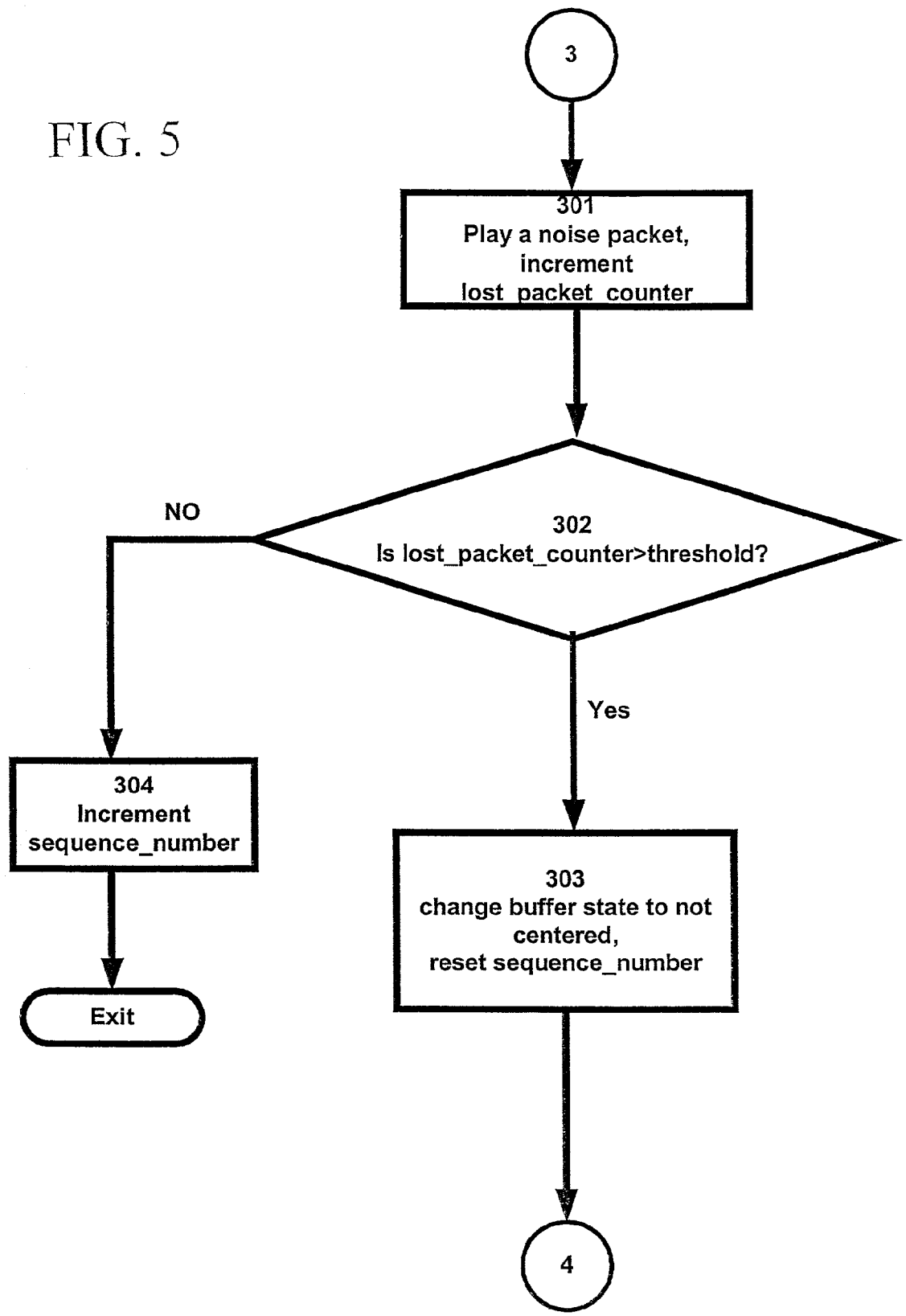

In FIG. 5:

Block 301—if the buffer is empty, a noise packet is played and the lost packets counter (lost_packet_counter) is incremented.

Figure 6:
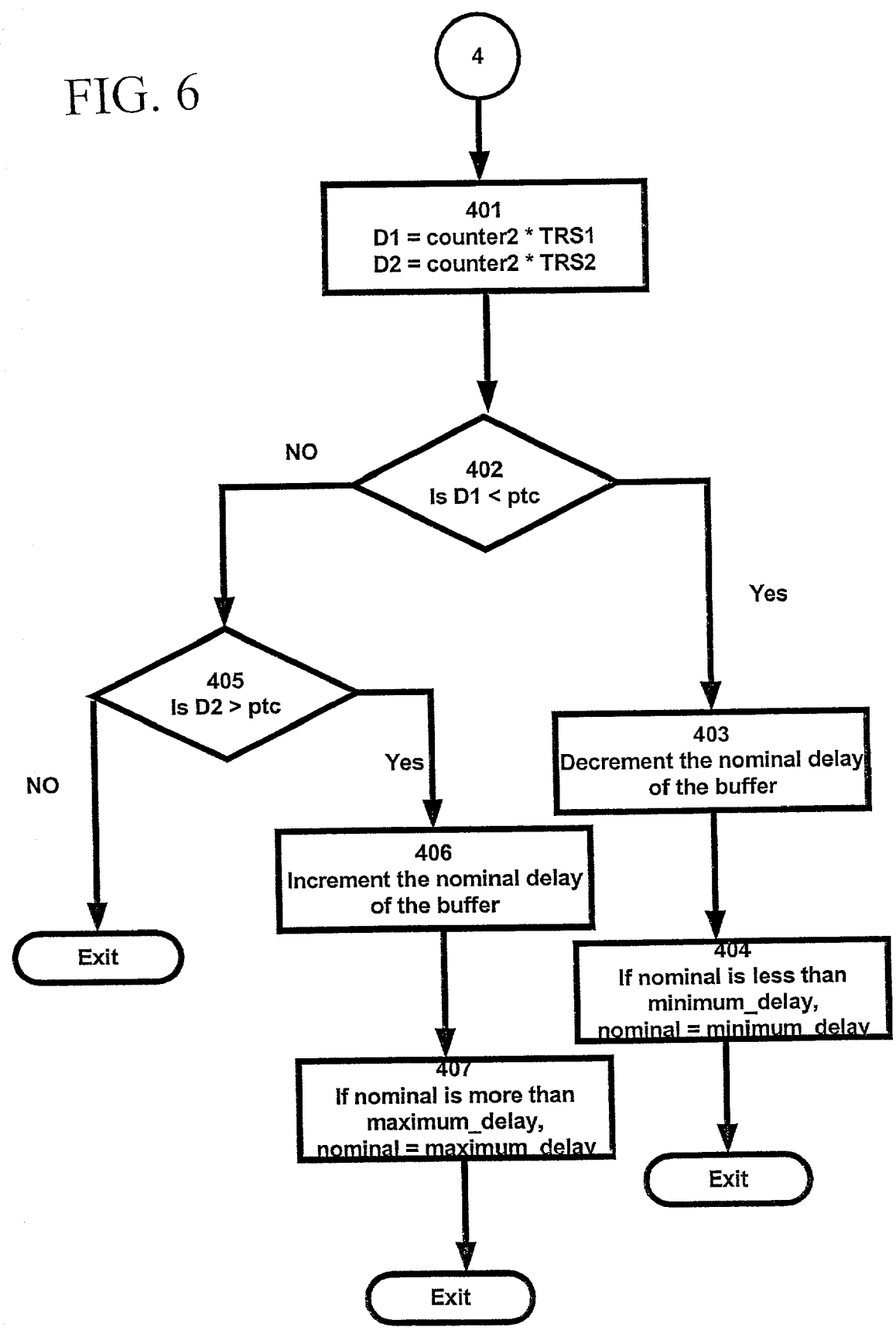

Block 302–Block 303—if lost_packet_counter is more than a pre-determined threshold, the buffer state is changed to not centered, and the adaptive process (4) is called (see FIG. 6).

Block 304—if the number of lost packets is less than the threshold, the sequence number of the last receive packet is incremented.

In FIG. 6:

Block 401, Block 402 and Block 405—Calculates two quantities that are used to determine if the nominal delay is too large or too small. They present the ratio of the packets, but are used this way to save division operation. Instead of asking Counter2/ptc>TRS2 to increment the delay (because too many packets are outside of the delay window) or counter2/ptc<TRS1 to decrement the delay (because too few packets are outside of the delay window), the algorithm calculates D1=counter2*TRS1 and D2=counter2*TRS2 and compares these quantities to ptc.

Block 304–Block 404—if D1 is less than ptc, decrement the nominal delay if the nominal delay is more than the minimum nominal delay.

Block 306–Block 407—if D2 is more that ptc, increment the nominal delay if the nominal delay is less than the maximum nominal delay.

By changing the nominal delay of a de-jitter buffer based on information that is collected since the last time that the nominal delay was changed, control of the de-jitter buffer is optimized in light of the characteristics of the network delay.

While an embodiment of the present invention is shown and described, it is envisioned that those skilled in the art may devise various modifications of the present invention without departing from the spirit and scope of the appended claims.

What is claimed is:

1. A device which is configured for implementation in a network which provides a multiple-line telephone link and a data link, said device comprising a de-jitter buffer for receiving packets of information, and a nominal delay associated with transfer of data out of the de-jitter buffer, said device configured to adjust the nominal delay based on delay information associated with the network, said device configured to count the number of packets which are received outside a delay interval and compare his number to a counter which invents each time a packet is read from the de-jitter buffer since a last time that the nominal delay has been adjusted, wherein the counter represents the total number of packets read from the de-jitter buffer since the last time that the nominal delay has been adjusted, in order to assess whether the nominal delay is to be adjusted, wherein the device is configured to adjust the nominal delay down to a pre-determined minimum nominal delay.

2. A device as recited in claim 1, wherein the device is configured to adjust the nominal delay between a pre-determined maximum nominal delay and a predetermined minimum nominal delay.

3. A device as recited in claim 1, wherein the device is configured to adjust the nominal delay up to a pre-determined maximum nominal delay.

4. A method of controlling a nominal delay associated with transfer of data out of a de-jitter buffer within a network, said method comprising automatically and continuously adjusting the nominal delay based on delay information associated with the network; counting the number of packets which are received outside a delay interval; and comparing this number to a counter which increments each time a packet is read from the de-jitter buffer since a last time that the nominal delay as been adjusted, wherein the counter represents the total number of packets read from the de-jitter buffer since the last time that the nominal delay has been adjusted in order to assess whether the nominal delay is to be adjusted, further comprising adjusting the nominal delay down to a pre-determined minimum nominal delay.

5. A method as recited in claim 4, further comprising adjusting the nominal delay between a pre-determined maximum nominal delay and a pre-determined minimum nominal delay.

6. A method as recited in claim 4, further comprising adjusting the nominal delay up to a predetermined maximum nominal delay.

* * * * *